Sept. 13, 1966　　　R. V. JENSEN ETAL　　　3,272,192
FILTER
Filed May 4, 1964
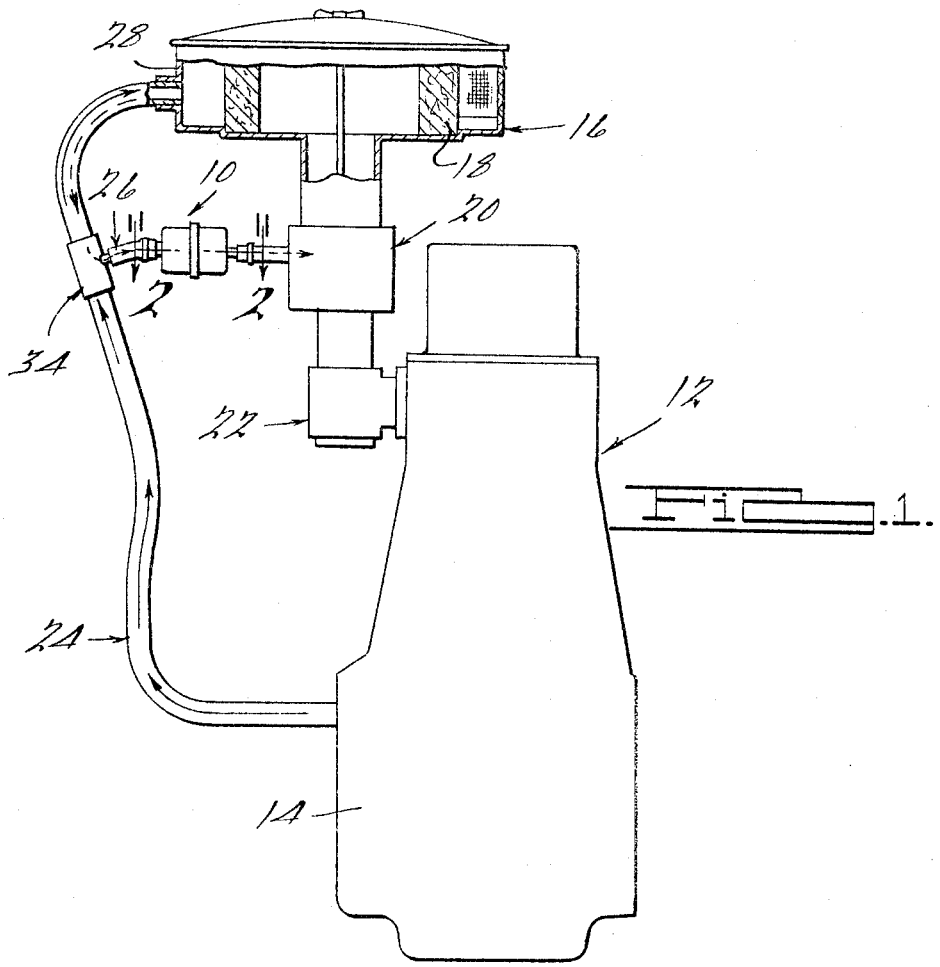
FIG. 1.
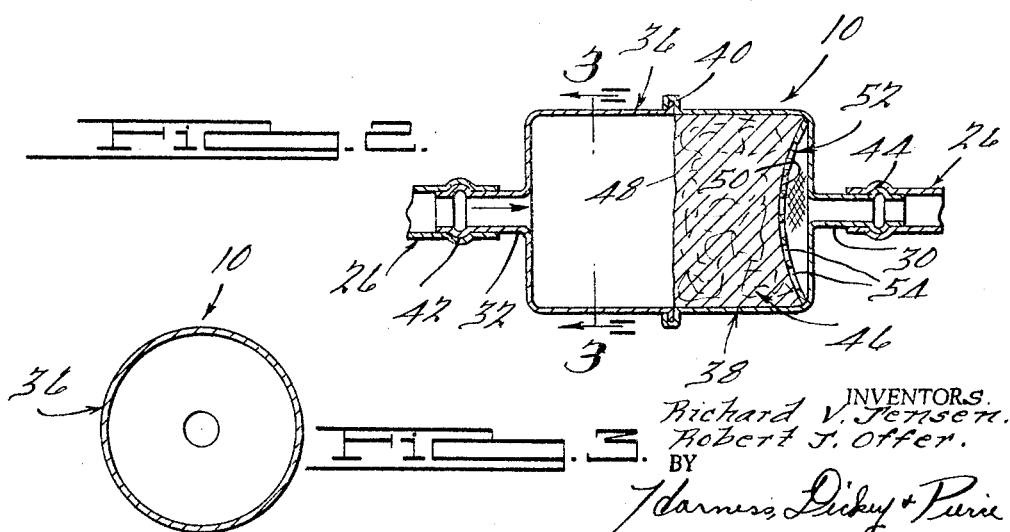
FIG. 2.
FIG. 3.
INVENTORS.
Richard V. Jensen.
Robert J. Offer.
BY
Harness, Dickey & Pierce
ATTORNEYS.

3,272,192
FILTER
Richard V. Jensen and Robert J. Offer, Racine, Wis., assignors to Walker Manufacturing Company, Racine, Wis., a corporation of Delaware
Filed May 4, 1964, Ser. No. 364,575
9 Claims. (Cl. 123—119)

This invention relates generally to internal combustion engines and, more particularly, to a filter device for use in an automotive crankcase vapor recirculation system.

In automotive engines that are provided with crankcase ventilation systems which include a primary breather tube communicating blowby gases directly from the engine crankcase to the air filter assembly, and which further include a ventilator tube communicating blowby gases from the primary tube directly to the engine's carburetor assembly, it has been found that when the engine is in an idling condition, it is possible for unfiltered air to bypass the air cleaner assembly by being drawn down from the intake side of this assembly through the primary breather tube and the ventilator tube, and be transmitted directly into the air-fuel mixture downstream of the carburetor throat. The present invention provides an extremely simple and effective filter device that is adapted to be mounted in-line in the ventilator tube of an automotive crankcase ventilation system, and thereby filter both air that bypasses the air cleaner assembly and crankcase contaminants such as residue and sludge from the blowby gases which may flow through the ventilator tube. It will be apparent, of course, that the filter device of the present invention may also be used in a variety of other types of crankcase breather or recirculation systems if desired.

It is accordingly a primary object of the present invention to provide a simple, economical, and effective filter device for use in an automotive crankcase ventilation system.

It is another object of the present invention to provide a filter device of the above character which imposes a minimum restrictive force on the gases being filtered therethrough.

It is still another object of the present invention to provide a filter device of the above character that may be conveniently installed in an automotive crankcase ventilation system.

Other objects and advantages of the present invention will become apparent from the following detailed description taken in conjunction with the accompanying drawings, wherein:

FIGURE 1 is a side elevational view of a preferred embodiment of the filter device of the present invention as seen in operative association with a schematic representation of a conventional automotive engine;

FIGURE 2 is a longitudinal cross-sectional view taken along the line 2—2 of FIGURE 1; and FIGURE 3 is a transverse cross-sectional view taken along the line 3—3 of FIGURE 2.

Referring now to FIGURE 1, a filter device 10, in accordance with a preferred embodiment of the present invention, is shown in operative association with an automotive engine, generally designated 12, having a crankcase 14 and an air cleaner assembly 16 which is provided with a suitable air filter element 18. The air cleaner assembly 16 is operatively connected through a carburetor assembly 20 and an intake manifold 22 to the intake section of the engine 12. A crankcase breather device or ventilation system, which includes a primary breather tube 24 and a ventilator tube 26, is operatively associated with the engine 12. The tube 24 is connected at its lower end to the crankcase 14 and at its opposite or upper end to an inlet section 28 of the air cleaner assembly 16. The ventilator tube 26 is provided in two sections, one of which communicates an outlet section 30 of the filter device 10 with the carburetor assembly 20, and the other of which communicates an inlet section 32 of the filter device 10 to the tube 24 through a T-fitting 34. During the operation of the engine 12, the tubes 24 and 26 respectively communicate blowby gases which accumulate within the crankcase 14 back to the air cleaner assembly 16 and the carburetor assembly 20.

Referring now to FIGURE 2, the filter device 10 of the present invention includes a cylindrical housing comprising a pair of annular, cup-shaped shells 36 and 38 which are connected at their respective open ends in an air-tight roll seam or joint 40. The outer ends of the shells 36 and 38 are swaged inward or necked down into coaxial, reduced diameter tubular sections which form the inlet and outlet sections 32 and 30, respectively. The sections 32 and 30 are respectively formed with radially outwardly extending shoulder sections 42 and 44 which function to secure and seal the ends of the tube 26 when they are press-fitted over the sections 32 and 30.

Disposed in the shell 38 is a filter element 46 which is generally cylindrical in transverse section and is formed with a substantially flat inlet end 48 and a concave-shaped outlet end 50. The filter element 46 is preferably fabricated of a non-absorbent fibrous material such as randomly oriented, resin-coated viscose rayon fibers of approximately 40 denier diameter and from 1 to 2 inches long, and which are adapted to be molded and cured directly within the shell 38. The interior of the shell 38 is coated with a suitable adhesive substance prior to molding the filter element 46 therein, so that the molded media is retained within the shell 38 after curing. One preferable form of the filter element 46 comprises the above filtering media compressed to a density of approximately 1.4 grams per cubic inch and has the following restrictive characteristics:

2.95 inches $H_2O$ at 1 c.f.m.
11.70 inches $H_2O$ at 2 c.f.m.

The concave-shaped outlet end 50 of the filter element 46 is molded against and contiguously bears upon an annular, dome configured support plate 52 that is disposed in the outer (right) end of the shell 38 in a position covering the inner end of the outlet section 30. The plate 52 functions as a migration barrier to prevent the filtering media from passing into the section 30 of the shell 38 during the molding of this material into the filter element 46 within the shell 38. As seen in FIGURE 2, the plate 52 is preferably formed of expanded metal and has a plurality of openings, generally designated 54, formed therein. It may be noted that the plate 52 may be satisfactorily formed from a dome-shaped disc having a plurality of prick-punched perforations formed therein.

The purpose of the concave-shaped outlet end 50 of the filter element 46 and the dome shape of the support plate 52, is to provide an outlet area for the filter element 46 of the same approximate size as the inlet area, thus minimizing any velocity gradient occurring across the element 46 and accordingly minimizing the amount of flow restriction imposed by the element 46. This is accomplished without any sacrifice in the compactness of the filter device 10, and assures that a uniform and continuous flow of gases will be transmitted therethrough even though the filter element 46 becomes partially clogged.

During normal operation of the engine 12, blowby gases are communicated from the engine's crankcase 14 through the tube 24 and into the inlet section 28 of the air cleaner assembly 16. A preselected quantity of the blowby gases being communicated through the tube 24 are transmitted through the T-fitting 34 and into the tube 26. These gases are communicated into the interior of the filter device 10 through the inlet section 32, whereby solid contaminants or residue within the gases are filtered therefrom as the gases pass through the filter element 46. The filtered blowby gases then pass through the outlet section 30 and directly into the carburetor assemby 20 through the breather tube 26. When the engine 12 is in an idling condition, the filter device 10 operates in an identical manner in filtering air which may be drawn from the intake section 28 of the air cleaner assembly 16, through the tubes 24 and 26 and into the carburetor assembly 20. In this case, it will be noted that the filter fibers of the element 46 are coated with oil from the oil fumes within the ventilator tube 26, and thus the filter element 46 acts as an impingement type filter to effectively remove any contaminants within the bypassed air.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is caimed is:

1. In a filter device
   a filter housing comprising a pair of cup-shaped shell sections,
   said shell sections being joined together in an air-tight joint,
   the outer ends of said shell sections being necked down and forming reduced diameter inlet and outlet sections,
   a cylindrical filter element in one of said shell sections,
   said filter element being formed with a generally concave end adjacent said outlet section, and
   an annular perforate support plate supporting said filter element in said housing in a position confronting said outlet section,
   said support plate being dome-shaped and being nested within said concave end of said filter element.

2. A filter device as set forth in claim 1 wherein said filter element is molded of a viscous rayon material.

3. A filter device as set forth in claim 1 wherein said filter element is molded within one of said shells.

4. In combination in a crankcase ventilation system for communicating blowby gases from the crankcase to the air intake section of an internal combustion engine,
   a primary tube communicable at one end with said crankcase and at the opposite end with said air intake section of said engine,
   a secondary tube communicable at one end with said air intake section of said engine and at the opposite end with said primary breather tube,
   a filter device mounted in-line in one of said breather tubes,
   said filter device including a cylindrical housing having inlet and outlet sections formed on the opposite ends thereof,
   said filter device further including a cylindrical filter element and an annular perforate support plate supporting said filter element in said housing.

5. The combination as set forth in claim 4 wherein said filter device is mounted in-line in said secondary tube.

6. The combination as set forth in claim 4 wherein one end of said filter element confronts said outlet section of said housing and is concave and wherein said support plate is of a dome-shaped configuration and supports said filter element adjacent said outlet section of said housing.

7. The combination as set forth in claim 4 wherein said filter element is molded to a density of approximately 1.4 grams per cubic inch and comprises a mass of randomly oriented rayon fibers of approximately 40 denier diameter and from 1 to 2 inches long.

8. In combination in a crankcase ventilation system for communicating blowby gases from the crankcase to the air filter and carburetor assemblies of an internal combustion engine,
   a primary tube communicable at one end with said crankcase and at the opposite end with said air filter assembly,
   a secondary tube communicable at one end with said primary breather tube and at the opposite end with said carburetor assembly,
   a filter device mounted in-line in said secondary breather tube,
   said filter device including a hollow cylindrical filter housing comprising a pair of cup-shaped shell sections,
   said shell sections being joined together in an air-tight roll joint,
   the outer ends of said shell sections being necked down and forming reduced diameter inlet and outlet sections,
   said filter device further including a cylindrical filter element in one of said shell sections,
   said filter element being formed with a generally concave end adjacent said outlet section, and
   said filter device having an annular perforate support plate supporting said filter element in said housing in a position confronting said outlet section,
   said support plate being dome-shaped and being nested within said concave end of said filter element.

9. In a crankcase ventilation system of an internal combustion engine having an air filter assembly and a carburetor assembly, a primary flow tube for crankcase blowby communicable at one end with the crankcase and at the opposite end with the air filter assembly, a secondary flow tube for crankcase blow-by communicable at one end with said primary tube and at the opposite end with said carburetor assembly, a filter device containing a filter means mounted in-line in said secondary tube and providing a resistance to flow of substantially 2.95 inches of water at 1 cubic foot per minute and 11.70 inches of water at 2 cubic feet per minute.

References Cited by the Examiner

UNITED STATES PATENTS

| | | | |
|---|---|---|---|
| 2,087,688 | 7/1937 | Johnson | 123—119 X |
| 2,539,378 | 1/1951 | Stootman | 55—519 X |
| 2,582,915 | 1/1952 | Sebok | 210—508 X |
| 2,686,504 | 8/1954 | Hill | 123—119 X |
| 2,987,175 | 6/1961 | Bottum | 55—503 |
| 3,088,447 | 5/1963 | Henderson | 123—119 |
| 3,092,091 | 6/1963 | Bosley | 123—119 |

MARK NEWMAN, *Primary Examiner.*

KARL J. ALBRECHT, *Examiner.*